United States Patent [19]

Clemence et al.

[11] 4,419,322
[45] Dec. 6, 1983

[54] METHOD FOR DILATING PLASTICS USING VOLATILE SWELLING AGENTS

[75] Inventors: Dudley A. Clemence; Pankaj K. Das, both of Willimantic, Conn.

[73] Assignee: Akzona Incorporated, Asheville, N.C.

[21] Appl. No.: 424,116

[22] Filed: Sep. 27, 1982

[51] Int. Cl.³ .............................................. B29C 25/00
[52] U.S. Cl. ................................... 264/343; 264/232
[58] Field of Search ........ 264/232, 343, 230, DIG. 71

[56] References Cited

U.S. PATENT DOCUMENTS

| | | | |
|---|---|---|---|
| 2,751,629 | 6/1956 | Dick | 264/DIG. 71 |
| 2,793,399 | 5/1957 | Gallay et al. | 264/DIG. 71 |
| 2,925,624 | 2/1960 | Stahl et al. | 264/343 |
| 3,541,200 | 11/1970 | Niegisch | 264/343 |
| 3,546,331 | 12/1970 | Niegisch | 264/343 |
| 3,546,332 | 12/1970 | Merriam et al. | 264/343 |
| 3,777,002 | 12/1973 | Suzuki et al. | 264/343 |
| 3,822,333 | 7/1974 | Haruta et al. | 264/178 F |
| 3,972,968 | 8/1976 | Kohn | 264/178 F |

Primary Examiner—Jay H. Woo
Assistant Examiner—W. Thompson
Attorney, Agent, or Firm—Francis W. Young; David M. Carter

[57] ABSTRACT

A novel method for dilating cold shrink articles such as insulating tubing is disclosed. The method makes use of a two phase bath comprising two immiscible liquids in which the lower phase is a swelling agent for the cold shrink material and the upper phase serves as a protective blanket which eliminates the generation of fumes by the swelling agent.

7 Claims, 2 Drawing Figures

METHOD FOR DILATING PLASTICS USING VOLATILE SWELLING AGENTS

BACKGROUND OF THE INVENTION

1. Field of the Invention

The present invention relates to a method for dilating plastic or elastomeric articles using volatile swelling agents. The invention further relates to a method for encapsulating wires, electronic components, or the like with such plastic or elastomeric articles.

2. Description of the Prior Art

It is a well established practice in the electronics industry to use shrinkable plastic tubing for insulating electrical connections and components as well as for binding wires or other components together. Shrinkable plastic articles have also found use in other fields, being used, for example, to join lengths of tubing or to seal the ends thereof. In the main, there are two classes of shrinkable plastic articles which have found widespread commercial use: "heat shrink" articles, which shrink upon the application of heat, and "cold shrink" articles, which shrink upon the evaporation of a volatile swelling agent. The invention concerns itself with this latter class of articles and, more particularly, with an improved method for using such articles.

In order to apply a cold shrink article to some object, a connection between two wires, for example, the material, is first dilated by soaking in a bath of some suitable, volatile swelling agent. The swollen cold shrink material is then placed around the item to be protected and the swelling agent is allowed to vaporize, causing the material to shrink back to its original dimensions and tightly adhere to the item.

Cold shrink materials offer an attractive and economical alternative to heat shrink materials as long as the shrinkage, which is limited to from 5 to 50 percent, is sufficient to meet the needs of the application. Cold shrink materials are less costly to manufacture than heat shrink materials and, because no heat is required to accomplish the reduction in size, cold shrink materials are more suitable for use with heat sensitive or delicate components.

As they are currently used, however, cold shrink materials do present a number of distinct disadvantages. With most commercially important shrink material, organic solvents are used as swelling agents. Those solvents which have been used in the past have generally been quite flammable. The fumes from these solvents are, at best, annoying to operating personnel, and they may actually be toxic. In either case, extensive fresh air ventilation must be provided. Further, the liquid solvents themselves tend to remove oils from the hands of an operator, causing dermatological problems if gloves are not worn. The solvents will also extract plasticizer and stabilizer from the cold shrink material if it is left in the solvent too long, leaving the material brittle.

It is the object of the present invention to provide an improved method for dilating cold shrink materials which avoids the above mentioned drawbacks of the currently used method but which retains the advangates of the same.

SUMMARY OF THE INVENTION

The present invention satisfies the above stated object by providing a method for dilating cold shrink materials which utilizes a two phase dilating bath. A solvent which is capable of acting as a swelling agent forms the first, or lower, phase of the bath. A second, nonvolatile liquid which is immiscible with the first and which has a lower specific gravity forms the second, or upper, phase. Shrinkable articles to be dilated may be conveniently introduced into the lower, swelling agent phase by passage through the upper phase. The upper phase serves primarily to blanket the lower volatile phase and thus prevent solvent loss and the generation of flammable or toxic fumes. In preferred embodiments, nonflammable and nontoxic solvents are used.

BRIEF DESCRIPTION OF THE DRAWINGS

The subject matter which is regarded as the invention is set forth in the appended claims. The invention itself however together with further objects and advantages thereof can be better understood by reference to the following description taken in conjunction with the accompanying drawings in which

DETAILED DESCRIPTION OF THE INVENTION

Figure 1:
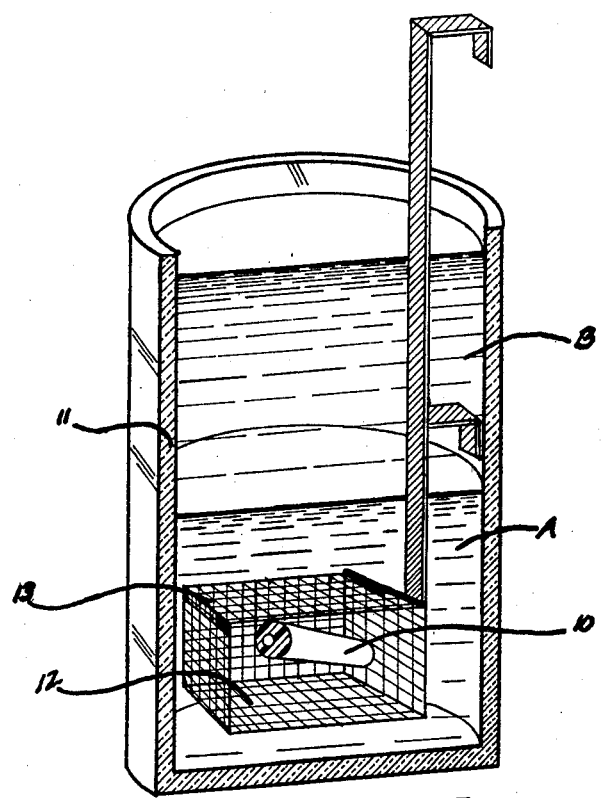
FIG. 1 is a sectional side elevational view of an apparatus for carrying out the method of the subject invention.
Figure 2:
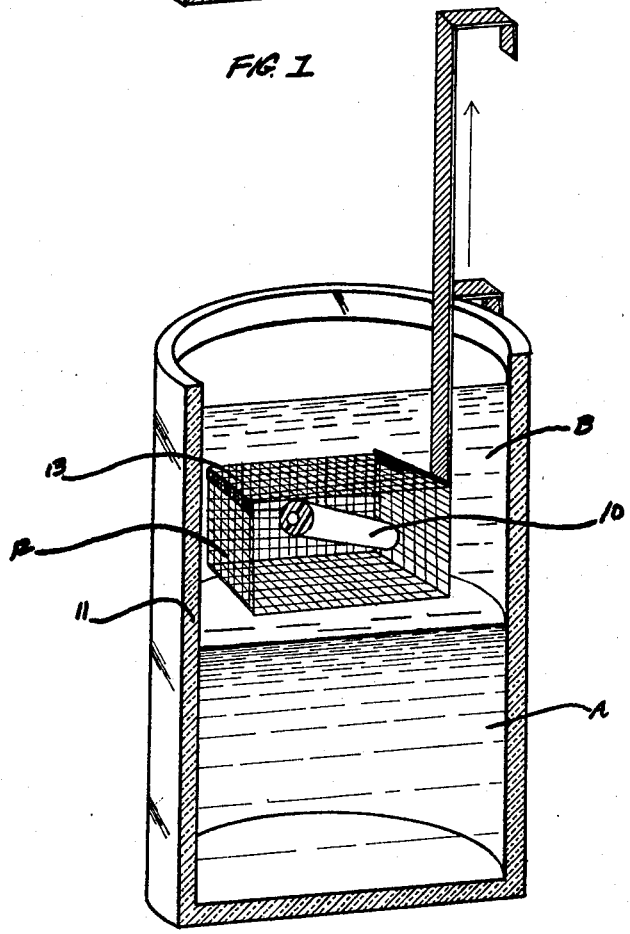
FIG. 2 shows the same apparatus as FIG. 1 but in a different state.

Details of the method provided by the present invention may now be more fully understood by reference to FIG. 1. Cold shrink articles to be dilated, shown to be pieces of tubing 10 for the purpose of illustration, are introduced into a tank 11 which contains a liquid bath comprising distinct lower and upper phases, A and B, respectively. The two bath components A and B are thus, of course, immiscible. The lower bath component A consists of an appropriate highly volatile swelling agent for the particular cold shrink material being used. Bath component B consists of a relatively nonvolatile liquid having a specific gravity which is less than that of component A. Component B accordingly forms a distinct layer which floats upon the component A. Because the two components are immiscible, component A cannot vaporize and, thus, in contrast to prior art methods, no dangerous or annoying fumes are generated.

It is preferred to use a basket 12 to introduce the tubing pieces 10 into the tank 11, as well as to later remove them therefrom, so that operating personnel may avoid prolonged skin contact with the bath components.

Upon introduction into the tank 11, the tubing pieces 10 are allowed to sink through the upper layer, component B, into the swelling agent, component A. If the specific gravity of the tubing pieces is such that they will not submerge on their own accord, means such as the screening 13 on the basket 12 may be provided to insure complete immersion. The tubing is left in the swelling agent until it is flexible and has expanded sufficiently to be placed over the component to be protected.

At this stage, the tubing 10 is removed from component A, the swelling agent, and is placed into component B. If a basket 12 is used to immerse the tubing in the swelling agent, it may simply be raised sufficiently to move the tubing pieces into the floating layer of component B within the tank 11, as shown in phantom in FIG. 1. Because the swelling agent is immiscible with component B, immersion of the swollen articles in component B retards vaporization of the swelling agent.

Tubing pieces 10 may be stored in a dilated state for a considerable amount of time without being left in the swelling agent. This advantageously insures that plasticizer will not be excessively leached from the tubing by the swelling agent. Tubing which shrinks due to a gradual loss of swelling agent can be transferred back to component A for a brief period of time in order to return it to a dilated state. After removal from component B, a piece of dilated tubing 10 is applied to a component to be protected in the usual fashion whereupon evaporation of the swelling agent causes it to shrink.

Several modifications can be made to this basic scheme. For example, where possible, a nonflammable and nontoxic swelling agent can be used as component A. Further, if an operator is to place his hands directly into the tank 11, component B may contain emollients in order to eliminate or at least ameliorate the removal of skin oils by the swelling agent.

In order that those skilled in the art may better understand how to practice the invention, the following examples are given for the purpose of illustration and not by way of limitation.

EXAMPLE 1

A sample of partially plasticized cold shrink poly(vinyl chloride) tubing (Turbotherm-Turboflex 105, manufactured by the Brand-Rex Company of Willimantic, Conn.) was dilated in the following manner.

The tubing was completely immersed in the lower phase of a two phase bath. This phase, which is a swelling agent for the vinyl tubing, consisted of 95 percent by volume of 1,1,1-trichloroethane, 2 percent of Freon TF (CCl FCClF), and 3 percent of Freon MF (CCl F). The upper phase of the bath, which consisted of water, eliminated the generation of fumes by the lower phase.

Testing of the lower phase of the bath showed it to be entirely nonflammable. (The components of the lower phase are generally regarded to be nontoxic.)

After about 20 to 25 minutes, the inside diameter of the vinyl tubing had expanded by about 30 percent and the tubing was soft, pliable and ready to be placed over an item to be protected.

At this point, the swollen tubing was raised, by the use of a basket, into the upper or water phase of the bath. The tubing was noted to remain substantially expanded while it remained in this phase for a period of at least thirty minutes. Gradual shrinkage did take place, however, and substantial shrinkage was noted at the end of about two hours. It was found that this shrunken tubing could be re-dilated by once again being immersed in the lower phase of the bath for a brief period.

The dilated tubing was removed from the upper phase of the bath. Under ambient conditions, the tube shrank rapidly during the initial five to eight minutes. Thereafter, it constricted more gradually over a period of about one hour, by which time it had returned to its original diameter.

EXAMPLE 2

Example 1 was repeated with the following modifications. The upper phase of the bath consisted of 80 percent water, 20 percent glycerin, 1 percent wetting agent (detergent), and a very minor amount of a dye to visualize the water layer (all percentages by volume). Once again, the upper phase effectively eliminated the generation of fumes. As a further modification, an operator used his uncovered hand to immerse the tubing into the lower phase of the bath and to remove it therefrom. The combination of glycerin and detergent in the upper phase of the bath effectively acted as an emollient and prevented any substantial removal of skin oil from the hand of the operator. The dilated tubing was stored in a separate container of water where it remained in a substantially enlarged state for a period of at least one half hour, after which it gradually shrank back to its original dimensions, over the course of about two hours.

EXAMPLE 3

Example 1 was repeated with the following modifications. The upper phase included a solution of 70 volume percent water, 20 percent Glycerol, 4 percent Parvinol-Aqua Rex (a detergent available from the R. T. Vanderbilt Co.) and 6 percent Sodiumborate. The lower phase was 1,1,1 Trichloroethane (80 percent) and 20 percent Toluol.

EXAMPLE 4

Example 3 was repeated with the following modifications. The lower phase was made from a solution consisting of 95 volume percent 1,1,1 Trichloroethane, 2 percent Trichloroethane and a mixture of 1,1,2 Trichloroethane-1,2,2 Trifluroethane.

EXAMPLE 5

A sample of silicone rubber tubing (silastic WC50 silicone rubber, manufactured by the Dow Chemical Company) was treated as in Example 1, except that the lower phase of the two phase bath consisted of a mixture of equal parts of Freon TF (CCl FCClF, manufactured by the duPont Company) and Freon MF (CCl F, also manufactured by duPont). The upper phase of the bath, which again consisted of water, effectively eliminated the generation of fumes from the fluorochemicals. Both of the fluorochemicals used are nonflammable and generally regarded as being nontoxic. The silicone rubber tubing was effectively dilated by the treatment.

EXAMPLE 6

Example 5 was repeated with the following modifications. The upper phase was a solution consisting of 70 volume percent water, 20 percent Glycerol, 4 percent Aqua Rex and 6 percent Sodiumborate. The lower phase was a solution of 1,1,1 Trichloroethane (50 percent), 20 percent Trichlorofluoromethane and 1,1,2 Trichloro-1,2,2 Trifluoroethane (30 percent).

All of the above examples yielded acceptable results.

As can be seen, various mixtures of 1,1,1 Trichlorethane and 1,1,2 Trichloro-1,2,2 Trifluoroethane and Trichlorofluomethane have been evaluated and it appears that these mixtures will be effective in dilation of PVC tubings in proportions of approximately 10 to 100 parts of 1,1,1 Trichlorethane and 50 to 80 parts of 1,1,2 Trichloro-1,2,2 Trifluoroethane or Trichlorofluoromethane. As to dialating silicone rubber tubing, mixtures of the two Freons in portions of 30 to 70 parts each to 100 parts of either have been found satisfactory. Also, mixtures of the above two Freons and 1,1,1 Trichloroethane in amounts of 0 to 70 volume percent of the latter have been found effective to dialate the silicone rubber tubing.

From the foregoing description of the preferred embodiments of the invention it will be apparent that many modifications may be made therein. It will be understood therefore that these embodiments are intended as exemplifications of the inventions only and the invention is not limited thereto. It should be understood that it is intended in the appended claims to cover all such modifications in the true spirit and scope of the invention.

I claim:

1. A method for dilating a cold shrink plastic article which comprises the steps of:

immersing said article into the lower phase of a bath having distinct upper and lower phases with said upper and lower phases being substantially immiscible, said lower phase being a volatile swelling agent for said cold shrink plastic article and having a specific gravity greater than that of said upper phase; said upper phase acting as a blanket to substantially prevent vaporization of said lower phase;

allowing said article to remain in said lower phase of said bath until it has dilated; and, removing said article from said bath for use.

2. The method of claim 1 comprising the further step of storing said dilated article in said upper phase prior to use of said article to thereby prevent premature shrinking of said article.

3. The method of claim 1 wherein said article is immersed into said lower phase of said bath by hand, said upper phase comprising one or more emollients to protect the hand of an operator.

4. The method of claim 3 wherein said upper phase of said bath predominantly comprises water and wherein said emollient comprises the combination of glycerin and a minor amount of wetting agent.

5. The method of claim 1, wherein said article is constructed of poly(vinyl chloride) and wherein said lower phase of said bath comprises between 30 and 90 percent by volume 1,1,1-trichloroethane, between 5 and 30 percent by volume 1,1,2-trichloro-1,2,2-trifluoroethane, and between 3 and 40 percent by volume trichlorofluoromethane.

6. The method of claim 1 wherein said article is constructed of silicone rubber and wherein said lower phase of said bath comprises between 30 and 100 percent by volume 1,1,2-trichloro-1,2,2-trifluoroethane and between 0 and 70 percent by volume trichlorofluoromethane.

7. The method of claim 1 wherein said swelling agent in said lower phase is taken from the group consisting essentially of 1,1,1 Trichloroethane, 1,1,2 Trichloro-1,2,2 Trifluoroethane, Trichlorofluoromethane and Toluol.

* * * * *